United States Patent [19]
Lescourret

[11] Patent Number: 5,847,976
[45] Date of Patent: Dec. 8, 1998

[54] METHOD TO DETERMINE THE POSITION AND ORIENTATION OF A MOBILE SYSTEM, ESPECIALLY THE LINE OF SIGHT IN A HELMET VISOR

[75] Inventor: Jean-Louis Lescourret, Merignac, France

[73] Assignee: Sextant Avionique, Velizy Villacoublay, France

[21] Appl. No.: 654,898

[22] Filed: May 29, 1996

[30] Foreign Application Priority Data

Jun. 1, 1995 [FR] France .................................. 95 06528

[51] Int. Cl.$^6$ .................................................. G01B 7/004
[52] U.S. Cl. ....................... 364/578; 702/153; 324/207.13
[58] Field of Search .................... 364/578, 559; 342/147, 448, 450, 451, 463; 345/7, 8; 324/225, 207.13

[56] References Cited

U.S. PATENT DOCUMENTS

| | | | |
|---|---|---|---|
| 4,287,809 | 9/1981 | Egli et al. | 324/260 |
| 4,394,831 | 7/1983 | Egli et al. | 324/225 |
| 4,613,866 | 9/1986 | Blood | 342/451 |
| 4,737,194 | 4/1988 | Jones | 342/448 |
| 5,307,072 | 4/1994 | Jones | 342/147 |
| 5,347,289 | 9/1994 | Elhardt | 342/448 |
| 5,457,641 | 10/1995 | Zimmer et al. | 345/8 |
| 5,583,335 | 12/1996 | Spitzer et al. | 345/7 |
| 5,600,330 | 2/1997 | Blood | 342/463 |
| 5,640,170 | 6/1997 | Anderson | 342/448 |
| 5,646,524 | 7/1997 | Gilboa | 342/450 |

FOREIGN PATENT DOCUMENTS

| | | |
|---|---|---|
| 0 058 412 | 8/1982 | European Pat. Off. . |
| 0 581 434 | 2/1994 | European Pat. Off. . |

*Primary Examiner*—Kevin J. Teska
*Assistant Examiner*—Tyrone V. Walker
*Attorney, Agent, or Firm*—Oblon, Spivak, McClelland, Maier & Neustadt, P.C.

[57] ABSTRACT

A method for determining a position and an orientation of a system that is mobile with respect to a transmitter of an electromagnetic field, the mobile system being placed in a carrier and being linked to a magnetic field sensor. The method including a first step of analytic modeling of the electromagnetic fields as a function of the coordinates of the sensor, a first field ($B_0$) being created by the transmitter, a second field ($B_1$) being created by the electrical currents induced in the carrier by the first field ($B_0$), and a third field ($B_2$) being created by the electrical currents induced in the mobile system by the first two fields ($B_0+B_1$), the magnetic effect of each field ($B_0$, $B_1$, $B_2$) being characterized independently of the effects of the other fields by the coefficients of a model thereof. The method further including a second step of real-time computation of the position and orientation of the sensor by using a current measurement of the electromagnetic field at the sensor and by using the models of the fields ($B_0$, $B_1$, $B_2$) from the first step, the position and orientation of the sensor being defined from a measured field ($B_m$) from which the third field ($B_2$) is deduced. The method has applications in determining the position and orientation of the line of sight in a helmet visor.

20 Claims, 8 Drawing Sheets

METHOD TO DETERMINE THE POSITION AND ORIENTATION OF A MOBILE SYSTEM, ESPECIALLY THE LINE OF SIGHT IN A HELMET VISOR

BACKGROUND OF THE INVENTION

1. Field of the Invention

The present invention relates to the determining of an orientation related to a mobile system, for example a helmet visor, and more particularly to a method to determine an orientation related to a mobile system enabling high precision to be obtained.

2. Description of the Related Art

The problem is that of achieving a precise identification of the direction of an oriented axis without any physical contact with this axis, especially in helmet visor systems used in combat aircraft and helicopters. The working of such a system is recalled briefly here below: using an ancillary collimator device, the pilot looking through a semi-reflective glass fixedly joined to the helmet and interposed on an axis of vision, sees the image of a reticule projected to infinity superimposed on the outside scene. When the pilot wishes to designate a target, he makes this reticule coincide with the target and reports that coincidence has been achieved, for example by using a push-button control designed for this purpose.

Provided that the exact position of the helmet is identified when he reports the coincidence, it is possible to determine the direction of sight in relation to the aircraft and designate the objective to a weapon system or point an optical or other system in this direction.

There is a known orientation measurement device described in the French patent No. 79 14441, especially for helmet visor systems in which, to bring the line of sight determined by the position of the pilot's helmet into a system of coordinates related to the aircraft, a position sensor formed by three orthogonal electromagnetic coils is placed on the helmet which is assumed to be rigid. Furthermore, at a fixed point of the cockpit, three other electromagnet coils are placed, forming a transmitter. The method consists then in making an electrical current pass successively into each coil of the transmitter. These currents cause the successive appearance of three associated magnetic fields that are picked up by the coils of the sensor, forming the mobile trihedron linked to the helmet.

For each magnetic field transmitted, the three corresponding orthogonal components are picked up in the coils of the sensor. The nine resulting components enable a passage from the mobile trihedron to the fixed trihedron. Indeed, these nine components depend:

on the position of the sensor in space;

the orientation of the sensor.

In fact, the conversion resulting from such a method may be fairly different from the conversion of the coordinates making it possible to pass swiftly from the mobile reference trihedron to the fixed reference trihedron with respect to the aircraft, especially because magnetic fields are used. Indeed, these fields may be especially disturbed by the electrical currents flowing in all the metal elements of the environment of the cockpit, for example eddy currents. Furthermore, defects inherent to the making of the magnetic transmission or magnetic reception coils also create modifications with respect to the dipolar field.

The determining of a direction by using the laws of electromagnetism in free space is therefore not possible when the space considered is the pilot's cockpit in an aircraft or any environment formed by conductive elements.

This is why in certain known devices it is provided, before each measurement, to memorize preliminary measurements and compare measurements made at a given instant with the memorized measurement in order to determine the rotation that brings about the passage from the fixed trihedron to the mobile trihedron. Such a method requires the memorizing of a very large quantity of measurements which must be entirely reviewed once there is a change in parameters such as, for example, the precise position of the mobile transmitter with respect to the line of sight.

Other methods enabling an improvement in the performance characteristics have been achieved for example in the French patent 90.08230 corresponding to U.S. Pat. No. 5,457,641. However, as mentioned in this patent, the model-making or modelling method comprehensively takes account of three sources of generation of magnetic fields, namely:

the transmission and reception antennas, including their defects, the disturbances due to the eddy currents flowing in the conductive parts of the cockpit, sometimes described as reflections of fields transmitted by the transmitter, the disturbances due to the conductive and magnetic parts fixed to the pilot's helmet and hence linked to the magnetic sensor system of coordinates.

The main drawback of the prior art methods is their lack of precision and robustness, namely their excessive sensitivity to variations in fields transmitted by the three previous sources which themselves depend:

on variations in the position and orientation of the transmitter in a reference system of coordinates, geometrical variations of the cockpits expressed by variations in the position and orientation of the disturbances, metal plates for example, with respect to a mechanical system of coordinates, variations in the positions or orientation of the disturbing parts fixed to the helmet (helmets of different sizes, customization of inter-pupil adjustment for each pilot, etc.).

With regard to the cockpit of the aircraft or helicopters, there are two types of variation:

variations in time in one and the same cockpit (vibrations, stresses during flight, etc.), variations with respect to a reference cockpit.

The second type of variation is the most important one and the most difficult to resolve. The method indicated in the patent 90.08230 does not resolve these problems and furthermore entails the assumption that the magnetic cartographic measurements initially made are applicable to all cockpits of the same type.

Now it is very difficult to obtain great precision and at the same time have a system that is unaffected by changes in helmets or just by the dismantling and reassembly of helmets for one or more cockpits and by changes in cockpits for one or more different helmets, that is to say one or more pilots in particular.

The foregoing known methods do not resolve the problems of interchangeability and do not provide all the guarantees of the maintenance of performance characteristics when changing cockpits and/or changing helmets.

SUMMARY OF THE INVENTION

The present invention is aimed at overcoming the above-mentioned drawbacks. To this end, an object of the invention is a method for determining a position and an orientation of a system that is mobile with respect to a transmitter of an electromagnetic field, the mobile system that is placed in a carrier being linked to a magnetic field sensor, wherein said method comprises:

a first step for the analytic modelling of the electromagnetic fields as a function of the coordinates of the sensor, a first field ($B_0$) being created by the transmitter, a second field ($B_1$) being created by the electrical currents induced in the carrier by the first field ($B_0$) and a third field ($B_2$) being created by the electrical currents induced in the mobile system by the first two fields ($B_0+B_1$), the magnetic effect of each field ($B_0$, $B_1$, $B_2$) being characterized independently of the effects of the other fields by the coefficients of its own model;

a second step for the real-time computation of the position and orientation of the sensor by using the current measurement of the electromagnetic field at the sensor and by using the models ($B_0$, $B_1$, $B_2$) of the first step, the position and orientation of the sensor being defined from the measured field ($B_m$) from which the third field ($B_2$) has been deducted.

The main advantages of the invention are that it can be used to:

improve the performance characteristics of the preceding methods and also that described in the patent 90.08230 while at the same time being more capable of withstanding the strains undergone, over periods of time, by the cockpit;

make the system insensitive to the variations of the environment (the cockpit and the helmet). The method of the patent 90.08230 requires the implementation of cartographic measurements that can last 24 to 30 hours, more than 20,000 measurement points being necessary, to use high-order polynomials in order to obtain the requisite precision, the aircraft being then immobilized for more than one week;

separately identify the three sources of disturbance in a manner that is simple and above all almost "transparent" for the user, i.e. without thereby increasing the immobilization time of the aircraft needed for harmonization. Harmonization is defined as the operation making it possible either to adjust a measurement referential system parallel to the referential of the aircraft or to measure the angular coordinates of its unit vectors in this same referential of the aircraft. Performing cartographic measurements for half an hour to two hours is enough to implement the method that is an object of the invention.

For different cockpits of one and the same series, the harmonizing of the transmitter by optical means with respect to the aircraft system of coordinates is replaced by a magnetic measurement (measurements enabling the position and orientation of the transmitter to be determined).

One characteristic of the invention especially consists of the association of a polynomial model providing a comprehensive and approximate expression of the position/orientation of the mobile system as a function of measurements, for example of the type described in the French patent No. 90.08230, with a model of the non-linear fields with respect to the position/orientation of the sensor. The first model enables a non-iterative approximate resolution to give an approximate position/orientation. The second model uses the approximate values of the above-mentioned resolution to make a very precise identification or at least a more precise identification of the position/orientation in a very short period of time by means of an iterative method that iterates a non-linear criterion.

BRIEF DESCRIPTION OF THE DRAWINGS

Other features and advantages of the invention shall appear from the following description, made with reference to the appended drawings, of which.

DETAILED DESCRIPTION OF THE PREFERRED EMBODIMENTS

The modelling of the electromagnetic field in a cockpit is based on the following assumptions:

The total field is the sum of three fields:

the field $B_0$ produced by the transmission coils, the field $B_1$ induced by $B_0$ which prompts eddy currents in the fixed conductors of the cockpit, the field $B_2$ induced by $B_0+B_1$ that prompts eddy currents in the conductors that are mobile in the field and are linked to the head equipment (helmet). In general $|B_2|<|B_0+B_1|$.

The sum $B_0+B_1$ is the field existing in the cockpit, when there are no conductors in the helmet.

The fields are expressed by analytic functions, the parameters of which are the coordinates of the sensor. These functions are solutions of the field equations according to the known Maxwell equations.

The solutions of the field equations theoretically depend only on the conditions at the boundaries of the volume, namely its surface.

Hereinafter, it will be sought to obtain a separate modelling of the fields ($B_0+B_1$) and $B_2$. For the modelling of ($B_0+B_1$), knowledge of the model of $B_0$ (free space) is used to deduce the field $B_1$ therefrom.

The orientation of the fixed sensor on the helmet is determined by carrying out a magnetic cartographic measurement on the basis of which a model of the magnetic field is determined for the volume in which the sensor freely moves.

Figure 1:
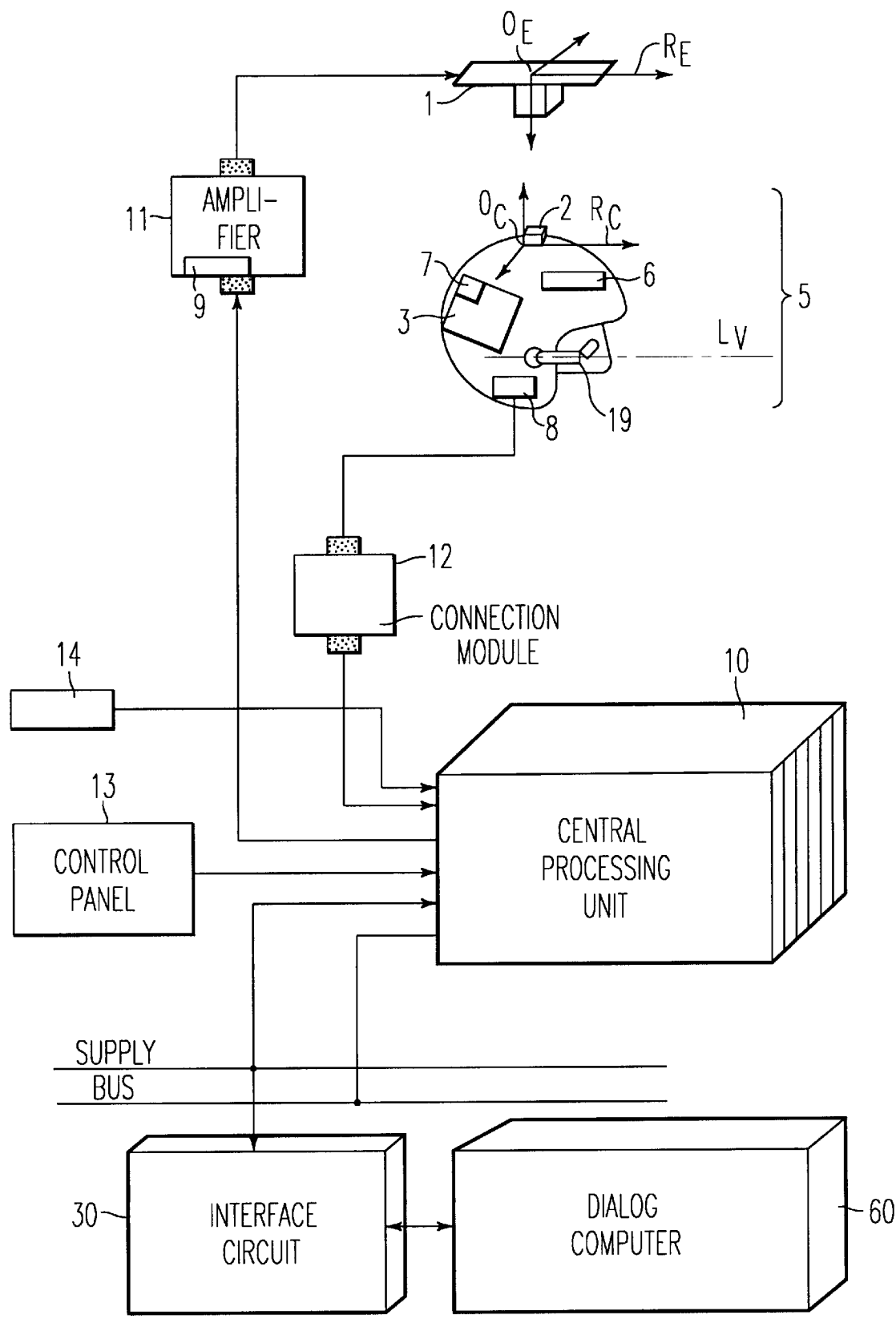
FIG. 1 shows a first system of cartography for the implementation of the method according to the invention.

FIG. 1 shows a general block diagram of a first system of cartography for the implementation of the method according to the invention, comprising:

a transmission antenna for the transmitter 1 linked to a system of coordinates $R_E$ having a center $O_E$;

a reception antenna for the sensor 2 linked to a system of coordinates $R_c$ having a center $O_c$;

head equipment 5 (fitted-out helmet) consisting of a shell to which there are fixed notably the sensor 2, its preamplifier 3, the CRT tube or tubes 6, the optical module 19. The optical module is formed by a system for the generation of the symbol and an optical system for collimation at infinity and, finally, a semi-reflective system enabling this symbol to be superimposed on the outside scene, defining the line of sight $L_V$. The head equipment further comprises a memory 7 associated with the sensor 2 and a memory 8 associated with the helmet. These memories are, for example, PROMs, EPROMs or EEPROMs;

a central processing unit 10 for the equipment;

an interface circuit 14 and a dialog computer 15 connected for the management of the memories associated with the interchangeable sub-units, for example the sensor or the helmet, or for the remote loading of the programs. A connection module 12 connects the head equipment to the central processing unit 10. A supply bus is connected to the circuit.

A memory 9, placed for example on an amplifier 11 wired between the transmission antenna 1 and the central processing unit 10 is associated with the transmission antenna 1. A memory 14 associated with the carrier, namely for example with the cockpit of the aircraft, is connected for example to the central processing unit 10. These memories are, for example, PROMs, EPROMs or EEPROMs. The memory 9 associated with the transmission antenna 1 contains coefficients defining a model of the field above-mentioned $B_0$. The memory 14 associated with the carrier contains coefficients defining a model of the above-mentioned field $B_1$. The memory 8 associated with the helmet contains coefficients defining a model of the above-mentioned field $B_2$. The memories associated with the elements of the sub-units 7, 8, 9, 14 loaded with their coefficients are, for example, integral parts of these elements or sub-units. They are, for example, loaded in the factory before being associated with their respective elements. Each element or sub-unit 7, 8, 9, 14 is mounted or changed with its associated memory, the sub-unit 14 is associated with the cockpit.

Figure 2:
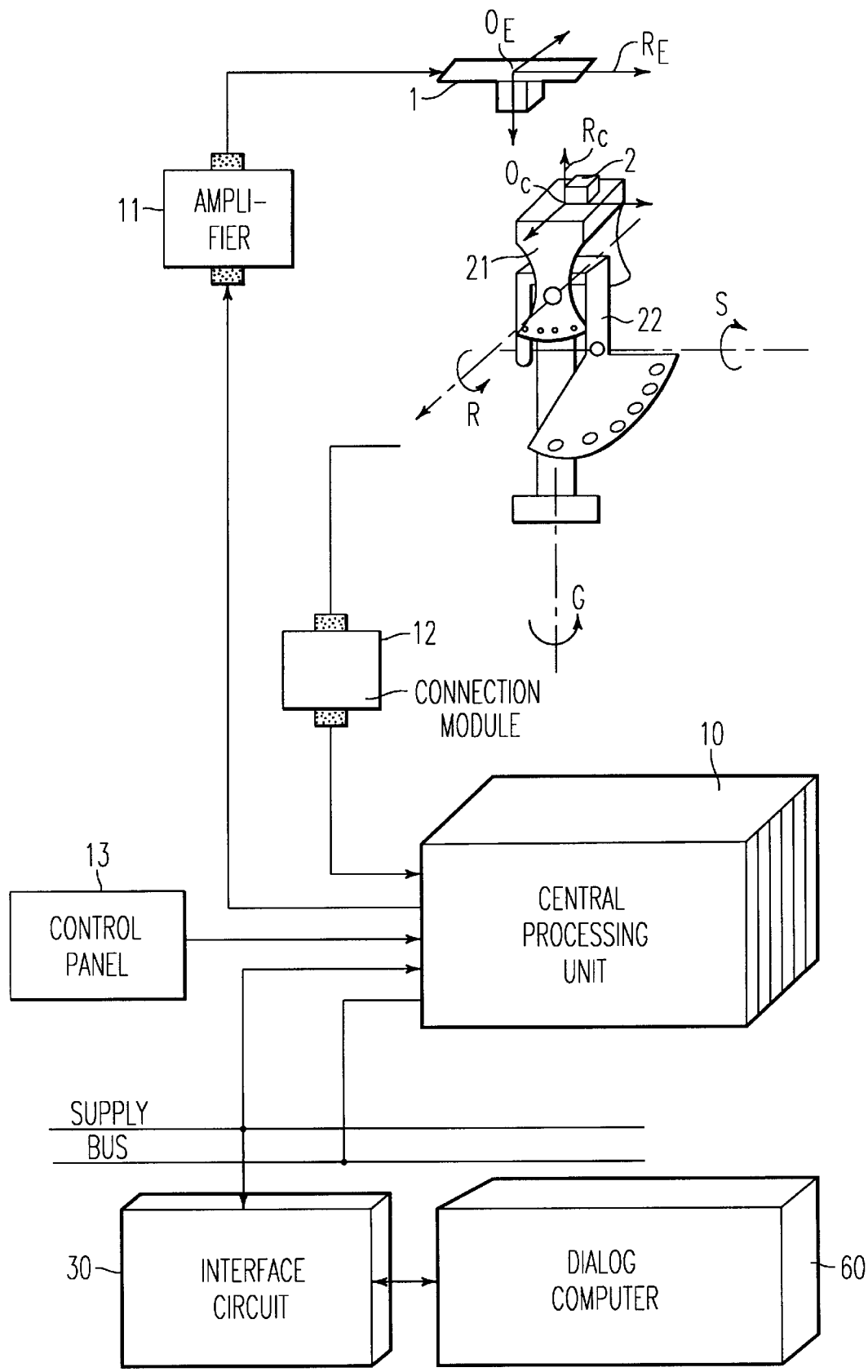
FIG. 2 shows a second system of cartography used for several modelling operations or operations for the characterizing of various sub-units.

FIG. 2 gives a view, for the implementation of the method according to the invention, of the block diagram of a second cartographic system for the implementation of the method according to the invention used for several operations of the modelling or characterizing of the various sub-units or cockpit.

Indeed, it can be used without distinction:

to characterize the antennas in the factory, by using a model of a free space $B_0$, the sensor being then mounted on a specific support or helmet shell enabling the sensor to be positioned according to the real use on the helmet;

to characterize the fitted-out helmets by using a model $B_2$ defined hereinafter;

to characterize the disturbances of the carrier, the configuration being identical to the first one mentioned here above used in the factory to characterize the antennas. The assembly is harmonized in the system of coordinates of the aircraft in a known way. A magnetic cartographic measurement is carried out in translation and also by rotations if necessary of the sensor in the volume of the cockpit of the aircraft. According to the invention, all the matrices of measurements are memorized. By way of an indication, a thousand matrices of 9 terms are enough to obtain a good model of the environment of the cockpit.

The sensor 2 is mounted on a mechanical support 21 that enables it to be rotated in three orthogonal rotations R, S, G.

The principle of the invention consists of a first step of initial modelling comprising:

an analytic modeling of the electromagnetic fields as a function of the coordinates of the sensor, meeting the laws of electromagnetism;

a separate modelling of the effects, especially those:
  related to the equipment:
    by creating a model $B_0$ of the antennas for transmission and reception in free space with their corrections;
    and a model $B_2$ of the disturbing effects of the helmet and head equipment,
  related to the environment in which the equipment is used:
    by creating a model $B_1$ of the disturbing effects due to the conductive parts of the cockpit:

a characterization of each source of disturbance independently of one another, by identification of the coefficients of its own model, which are then memorized in memories, for example PROMS, EPROMs or EEPROMs, associated with the modelled elements, considered as being "interchangeable", these elements being for example the transmitter, the sensor, the helmet and the carrier (cockpit for example).

In a second step, the method according to the invention consists of a real-time computation of the position and orientation especially of the sensor as well as of the helmet and of the line of sight by using the current measurement and the memorized model.

This second step makes use, for example, of:

a non-iterative algorithm by which an approximate value of the position and orientation of the sensor can be furnished in a very short time;

an iterative algorithm enabling the optimizing of the computation of the position and the orientation of the sensor that come into play in the analytical model, whose parameters are memorized in the associated memories 7, 8, 9, 14.

The use of the model of the helmet $B_2$ must especially meet the following conditions:

the antenna model $B_0$ and the cockpit model $B_1$ being determined, the model of $B_2$ is applied without distinction to all the fields $(B_0+B_1)$ provided that they are known themselves, the coefficients of $B_2$ being determined without knowledge of $B_1$ at the outset. In particular, the coefficients of $B_2$ are identified independently of $B_1$, i.e. in the factory for example, $B_0$ being generated and known. On the contrary, the compensation for $B_2$ in the cockpit, which depends on $(B_0+B_1)$, is valid for all $(B_0+B_1)$ provided that the parameters of $B_0$ and $B_1$ are known and used in the $B_2$ compensation model;

the identification or characterization of the antennas and of the helmet, namely all the equipment, is done in the factory; that of cockpit is done independently on-site using cartographic tools without helmet with previously characterized antennas. All this is made possible by the total interchangeability of the sub-units (maps, amplifiers, antennas after correction). A cartographic tool is, for example, a sensor calibrated on its mechanical support. This support may be harmonized in the aircraft system of coordinates by magnetic measurements for example or else its orientation may be measured optically in the aircraft system of coordinates.

Before the steps of the method according to the invention are described in greater detail, the following notations need to be taken into account:

$$\vec{v} = \begin{vmatrix} (\hat{\vec{X}}) \\ \vec{ROT} \end{vmatrix}$$

with $$\hat{\vec{X}} = \begin{vmatrix} \hat{X} \\ \hat{Y} \\ \hat{Z} \end{vmatrix} \quad \begin{array}{l} \hat{X}, \hat{Y}, \hat{Z} \text{ being the} \\ \text{estimated coordinates} \\ \text{of the sensor } X, Y, Z \end{array}$$

$$\vec{Rot} = \begin{vmatrix} G \\ S \\ R \end{vmatrix} \quad \begin{array}{l} G, S, R \text{ being the} \\ \text{angles defining the} \\ \text{rotation of the} \\ \text{sensors } (C) \text{ system} \\ \text{of coordinates} \end{array}$$

It must be noted that $\vec{Rot} \neq [ROT]$, $\vec{Rot}$ being a vector, [ROT] being the corresponding matrix.

The vector $\hat{v}$ is the estimated value of the vector $v$.

The models $B_0$, $B_1$, $B_2$ are defined by the functions:

$$B_0 = B_0(\vec{A}_0, \vec{X})$$

$$B_1 = B_1(\vec{A}_1, \vec{X})$$

$$B_2 = B_2(\vec{A}_2, \vec{X}, \vec{Rot})$$

$(\vec{A}_0)$ is the vector of parameters characterizing the antennas: sensor i and transmitter j. It is therefore possible to define $\vec{A}_O$ by $(\vec{A}_0)_{ij}$ to link the sets of parameters to the corresponding antennas.

$(\vec{A}_1)_l$ is the vector of parameters of the field $B_1$ of the cockpit number l.

$(\vec{A}_2)_k$ is the vector of parameters of the field $B_2$ pertaining to the helmet number k.

$(\vec{A}_{MK1})$ is the vector whose components are the parameters of the model $(B_0 + B_1)$ identified by the method described in the patent No. 90.08230 for a standard configuration (standard antenna, helmet and cockpit).

Figure 3:
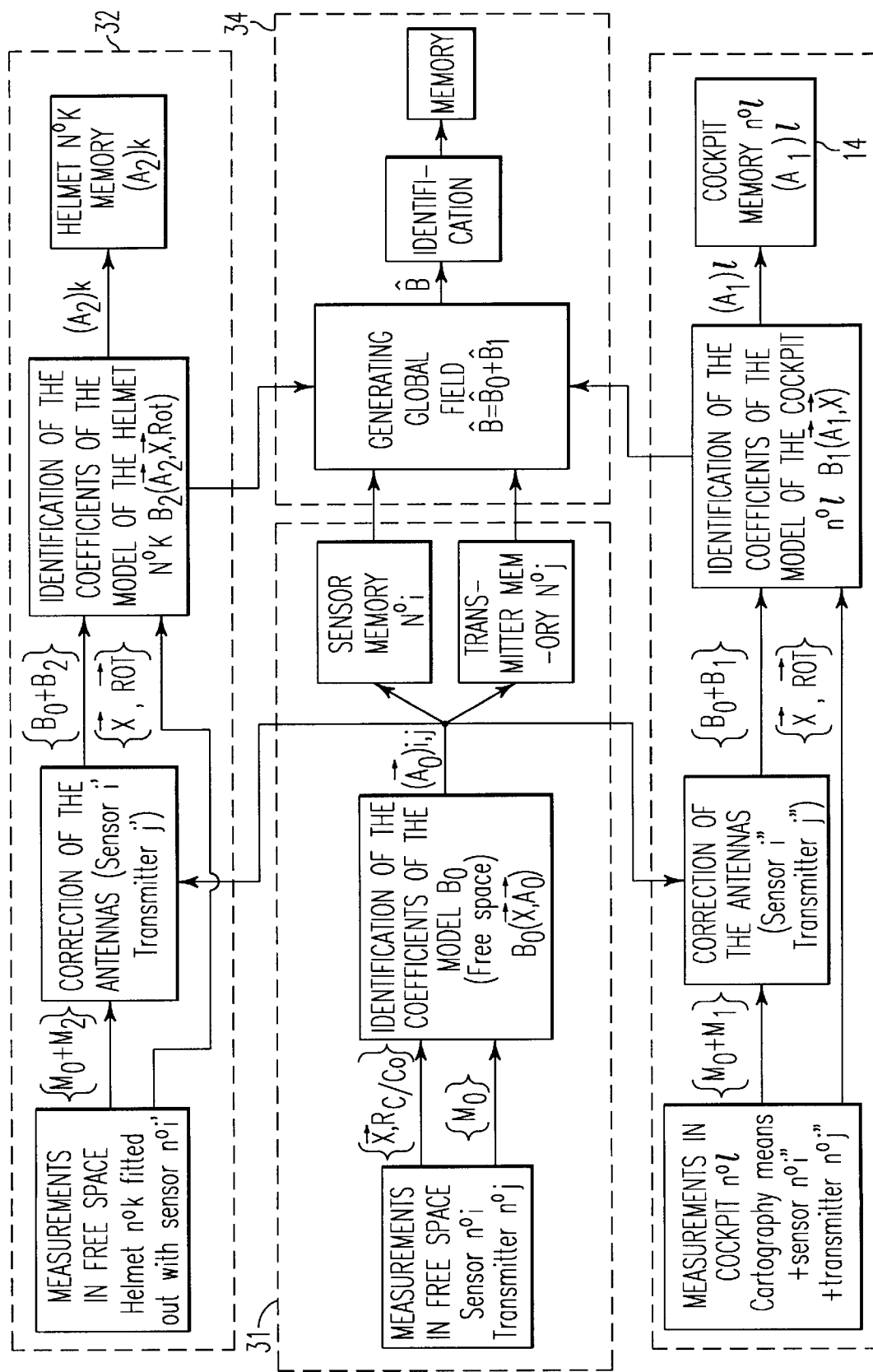
FIG. 3 shows an illustration of a possible implementation of the first step of the method according to the invention.

FIG. 3 illustrates the first step of the method according to the invention. This first modelling step comprises a first sub-step 31 for determining the coefficients of the model of the effects of the sensor No. i and of the transmitter No. j in free space.

The model in free space $B_0$ is obtained as follows:

At each transmission, there are the three components of the transmitter field available, namely the three vectors:

$$\vec{M}_1, \vec{M}_2, \vec{M}_3$$

that are combined in a measurement matrix $$[M] = [\vec{M}_1, \vec{M}_2, \vec{M}_3] \text{ or } [\vec{M}]_i \text{ measurement matrix at the instant } i.$$

The object of the model $B_0$ in free space is to identify all the parameters on which this model depends, namely:

the angular coordinates defining the matrix of passage from the reference system of coordinates to the transmitter system of coordinates (E) $R_{E/Ref}$ and of the position $\vec{X}_E$ of the transmitter in a reference system of coordinates Ref;

the angular coordinates of the sensor in a reference system of coordinates $C_0$ when the tool, namely the sensor support, is in an angular position of reference defining the matrix of $R_{C0/Ref}$ of the passage from the system of coordinates R to the system of coordinates $C_0$;

the matrices pertaining to the correction of the factor of scale and of coupling of the transmitter $[H_R K_R]$ and of the sensor $[H_C K_C]$;

the total transmitter sensor gain: $k_{CR}$.

The writing of the model of the measurement in the system of coordinates of the sensor (C) is as follows, assuming that the reference system of coordinates (R) is a mechanical system of coordinates as denoted (M):

$$\hat{M} = k_{CR}[H_C K_C]^t (R_{C0/M})^t (R_{C/C0})_M{}^t (R_{E/M})_M \frac{P}{\rho^3} [H_3] P^t [H_R K_R]$$

This is the same as expressing:

$$B_E = \frac{1}{\rho^3} P[H_3]P^t,$$

an expression known from the magnetic field of a dipole in the orthonomal system of coordinates of the transmitter with conventionally:

$$[H_3] = \begin{bmatrix} 2 & 0 & 0 \\ 0 & -1 & 0 \\ 0 & 0 & -1 \end{bmatrix} \text{ matrix of diploar magnetic coupling}$$

$$[P] = [\vec{U}_{XE}, \vec{U}_{XE}{}^\perp, \vec{U}_{XE}{}^{\perp\perp}]$$

$\vec{U}_{XE}$ is the unit vector of $\vec{X}_E = \vec{X}_{0C} - \vec{X}_{0E}$, namely of the transmitter-sensor vector $(\vec{X}_{0C}, \vec{X}_{0E})$: vectors whose components are respectively the coordinates of the center of the sensor and those of the center of the transmitter in the transmitter system of coordinates.

$\vec{U}_{XE}{}^\perp$ and $\vec{U}_{XE}{}^\perp$ are the perpendicular unit vectors forming the orthonormal reference known as the radial reference.

The corrected measurement can be written in the sensor reference (C):

$$[B_C] = \frac{1}{k_{CR}} [H_C K_C]^{-1}[M][H_R K_R]^{-1}$$

referenced $[B_c]_i$ at the instant i.

Wherein:

$H_C$ and $H_R$ are the matrices defined by the unit vectors of respectively the sensor and the transmitter axes expressed in an orthonormal system of coordinates related to elements (the axis $\vec{X}$ of these systems of coordinates is colinear with an axis taken as a reference, the two other perpendicular axes forming an orthonormal system of coordinates);

$k_{CR}$ is a coefficient of standardization of the transmitter and sensor factors of scale comprehensively.

We therefore have the following relationship in the mechanical reference system of coordinates:

$$B_C = (R_{C0/M})^t{}_M (R_{C/C0})^t M (R_{E/M})_M B_E = (R_{C/M})^t{}_M (R_{E/M})_M B_E$$

$$B_C = (R_{C/M})^t (B_E)_M$$

$B_E$, $(B_E)_M$ and $B_C$ are the components of the field vectors expressed respectively in the system of coordinates of the transmitter, the mechanical system of coordinates and the sensor system of coordinates.

The identification of the dipolar free space model consists of the computation, from a certain number of measurements M and rotations $(R_{C0/0})_M$, of the following parameters of the model:

$$k_{CR}, [H_C \ K_c], [H_R \ K_R], [R_{E/M}], [X_{OE}]_M, [R_{C0/M}]$$

respectively forming 1 term, 5 terms, 5 terms, 3 terms, 3 terms and 3 terms giving a total of 20 terms combined in the vector $(\vec{A}_0)$.

Then, for use in free space, it is necessary on the basis of the measurement M to find the position and orientation of the sensor (from which the line of sight is deduced) as follows:

Computation of:

a) $B_M$ (knowing $k_{CR}$, [$H_C \ K_C$], [$H_R K_R$])

b) $\vec{X}_E$ giving $\vec{\rho}$ and $\vec{P}$ from which we deduce $$\vec{B}_E = 1/\rho^3 \ \hat{P} \ [H_3] \ \hat{P}^t$$

With $R_{E/M}$ being known, $(B_E)_M$, is deduced, with the field $B_E$ expressed in the reference system of coordinates (the mechanical reference system of coordinates M).

We deduce therefrom:

$$[\hat{R}_{C/M}] = [\hat{B}_E]_M \cdot [B_M]^{-1}$$

In the presence of non-dipolar transmission, the terms of the magnetic coupling matrix are no longer constant but depend on the vector $\vec{X}_E$ according to the associated Legendre functions known to those skilled in the art.

The coefficients which are the components of the vector $(\vec{A}_0)_{ij}$ are stored in the memory 7 associated with the sensor No. i and in the memory 11 associated with the transmitter No. j.

The first sub-step 31 is followed by other sub-steps 32, 33 which use, for example, the coefficients $(\vec{A}_0)_{ij}$.

A following sub-step 32 consists of the modelling of a helmet No. k fitted out with a sensor No. i by measurements in free space.

Figure 4:
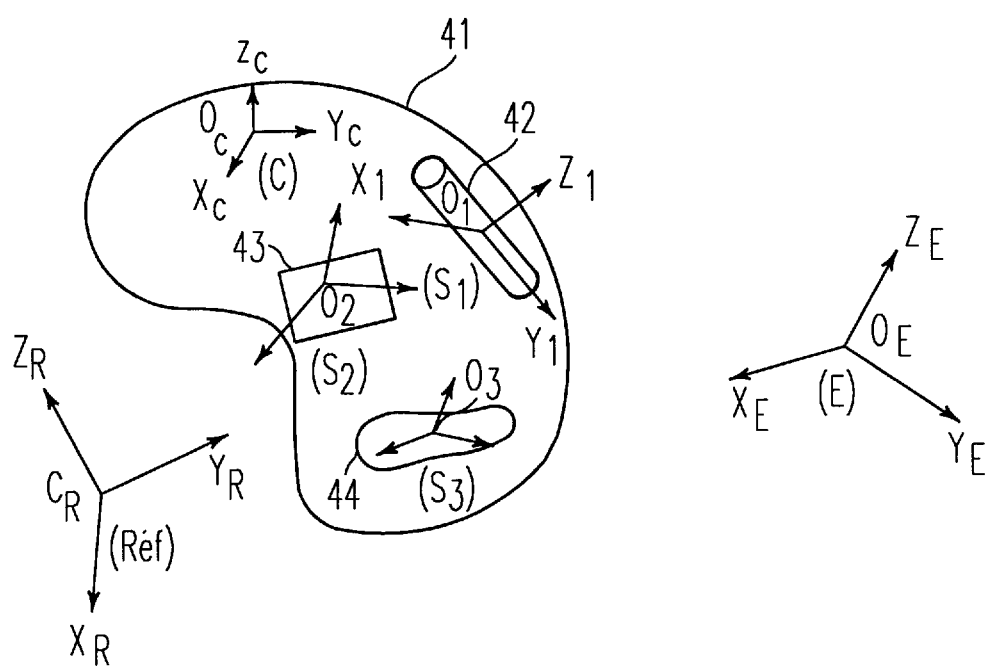
FIG. 4 shows a pilot's helmet fitted out with a magnetic field sensor and elements producing electromagnetic disturbances.
Figure 5:
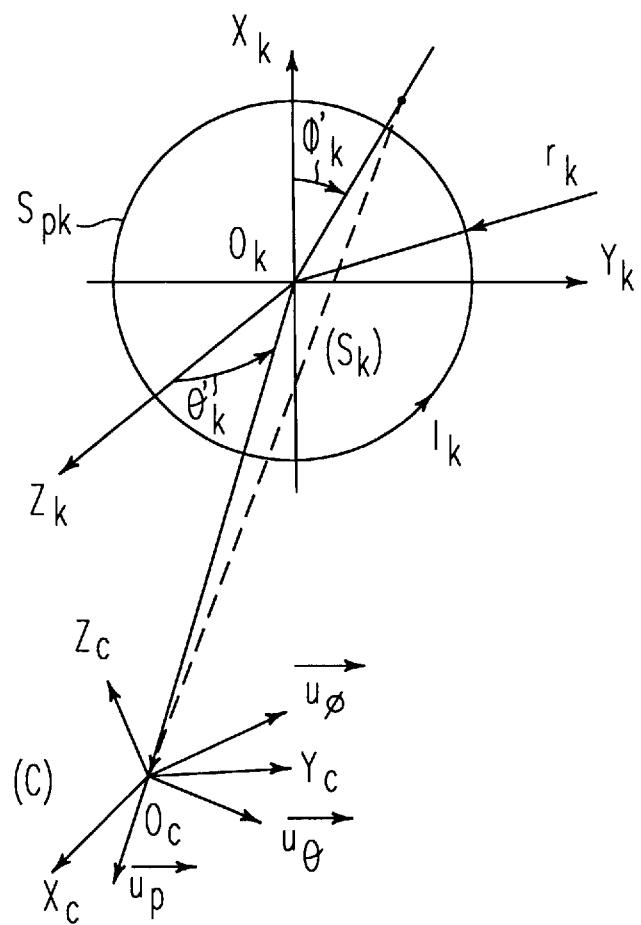
FIG. 5 shows a possible modelling of an above-mentioned source of electromagnetic disturbance.
Figure 6:
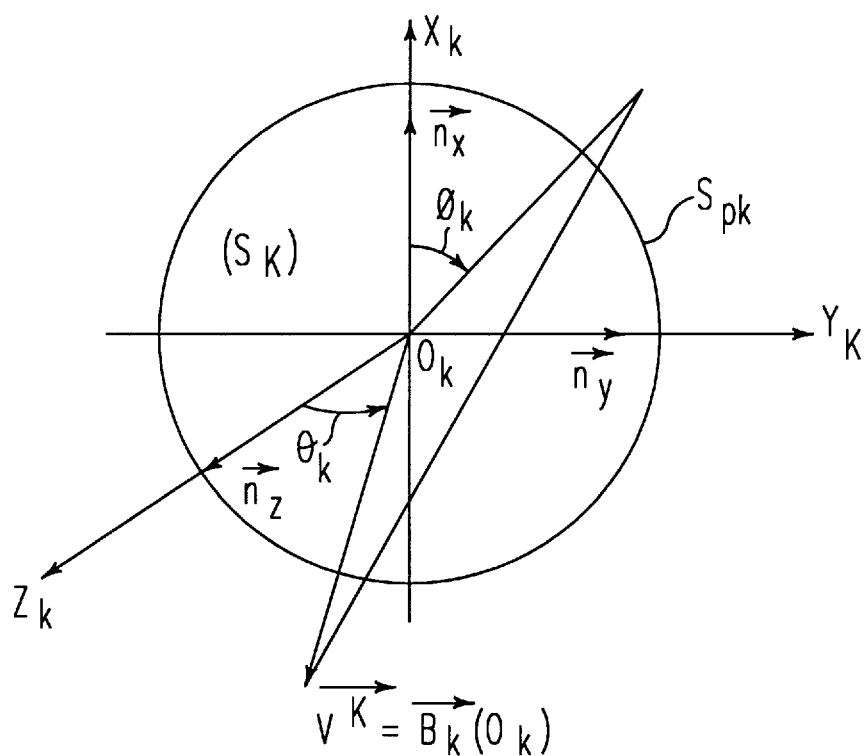
FIG. 6 shows an electromagnetic disturbance caused by the above-mentioned source.

FIGS. 4, 5 and 6 illustrate an example of the obtaining of the model B2 of the helmet No. k.

In FIG. 4, a sensor is represented by an orthonormal system of coordinates C with a point of origin $0_C$. The sensor is fixed, for example, to the helmet 41. Sources of electromagnetic disturbance 42, 43, 44 are furthermore fixed to the helmet 41. For example, they are limited to three. They are represented by orthonormal systems of coordinates $S_1$, $S_2$, $S_3$, ..., $S_k$ having respective points of origin $0_1, 0_2, 0_3, \ldots$, $0_k$ and respective axes $X_1, Y_1, Z_1 \ X_2, Y_2, Z_2 \ X_3, Y_3, Z_3$ and $X_k, Y_k, Z_k$. The directions of ($X_1, Y_1, Z_1$), ($X_2, Y_2, Z_2$), ($X_3, Y_3, Z_3$), ($X_k, Y_k, Z_k$) are any directions. The points of origin $0_1, 0_2, 0_3, \ldots, 0_k$ of the systems of coordinates are, for example, the centers of the sources of disturbances 42, 43, 44. Hereinafter, they shall be identified with their systems of coordinates.

The orthonormal system of coordinates C of the sensor is mobile in a reference system of coordinates (Ref) having a point of origin $0_R$. The systems of coordinates $S_1, S_2, S_3$ and more generally the system of coordinates $S_k$ when k>3 of the sources of disturbance are fixed with respect to the system of coordinates (C) of the sensor. An orthonormal system of coordinates (E) with a point of origin $0_E$, fixed in the reference system of coordinates (Ref) is linked for example to a magnetic induction transmitter used, in particular by means of the sensor fixed to the helmet i, to determine the position and orientation of this helmet as explained here above.

In a first stage, with the disturbance sources $S_1, S_2, S_3, \ldots, S_k$ being plunged into a given ambient magnetic field, produced for example by a transmission antenna [$B_0$] for each source, the model of the disturbance of the source at the sensor C is expressed as an explicit function of the existing mean field, for example at the point of origin $0_k$ of the reference system of coordinates defining this source. This makes it possible especially to define a model of the source depending explicitly on the field into which each source $S_k$ is plunged and consequently makes it possible to determine the parameters of the model of the source outside its electromagnetic environment of use, these two being independent of the ambient field.

In a second stage, with the sensor C being plunged into the magnetic field to be measured, the disturbance caused by each source $S_k$ is determined by means of its model and of the mean magnetic field existing at its level. In a third stage, the sum of the disturbances due to the sources is taken. Finally, in a fourth stage, this sum is deducted from the measurement made by the sensor C.

In this way, all the parameters of the source model representing the phenomenon of disturbance produced by this source are independent of the field into which the sensor and all the sources are plunged. Hence in the exemplary application, this set of parameters of the model is independent of the magnetic field into which the helmet is plunged. That is to say that the model can be determined especially in a field different from the field used operationally by the pilot. The above-mentioned first stage may thus for example be carried in the factory outside the operational environment, namely outside the aircraft cockpit for example. In the case of application to helmet visors notably, the source models may be identified in the factory by specific means such as a quasi-dipolar transmitter radiating in free space for example and may be used in an aircraft cockpit irrespective of the electromagnetic field existing in a frequency band containing the oscillation frequency of the field produced by the fixed transmitter E in the cockpit, provided that their model is also known and identified in a previous step.

The creation of a model representing the disturbance of a source may be done especially by assuming, in a simplified way, that a source, and especially a conductive element, behaves like one or more elementary current loops.

In free space for example, the magnetic field measured by the sensor C is the sum of the field transmitted by the transmitter E and of the fields produced by each source $S_k$ of the field. This measured magnetic field may be expressed by the following relationship:

$$B_C(O_c) = (R_{C/E})^t B_E(O_c) + \sum_{k=1}^{NS} R^t_{C/S_k} f_k(B_k(O_k)) s_k \quad (1)'$$

$B_c(0_c)$ being the total measured field expressed in the reference system of coordinates C of the sensor and of the center $0_c$ of the sensor;

$B_E(0_c)$ being the ambient field produced for example by the transmitter at the center $0_c$ of the sensor and expressed in the system of coordinates E of the transmitter, this field $B_E(0_c)$ is the field to be measured;

$(R_{c/E})^t$ being the transposed matrix of the matrix of passage from the system of coordinates E of the transmitter to the system of coordinates C of the sensor;

$R_{c/E}$ is written as $(R_{c/Ref})_E \ (R_{E/Ref})^t_E = (R_{E/Ref})_t^{Ref} (R_{c/Ref})_{Ref}$ where $R_{c/Ref}$ is the matrix of passage from the reference system of coordinates Ref to the sensor system of coordinates (C). Expressed in the system of coordinates E, it is written as $(R_{c/Ref})_E$ or in the reference system of coordinates, it is written as $(R_{c/Ref})_{Ref}$.

$R^t{}_{c/E} B_E (0_c) = R^t{}_{c/Ref} [B_E(0_c)]_{Ref} [B_E(0_c)]_{Ref}$ is the ambient field expressed in the reference system of coordinates Ref;

$B_k (0_k)$ is the mean magnetic field at the center $0_k$ expressed for example in the system of coordinates $S_k$;

the function $f_k$ represents the relationship existing between the ambient field of the point $0_k$ and the disturbing field at the point $0_c$ produced by the source k and expressed in the system of coordinates $(S_k)$;

$R_{c/Sk}$ is the matrix of passage from the system of coordinates $S_k$ of the source $S_k$ to the system of coordinates C of the sensor;

NS is the number of disturbing sources.

FIG. 5 illustrates a model representing the disturbance of a source $S_k$. This model is formed by an elementary loop or turn $SP_k$ having a center $0_k$ which is the point of origin of the orthonormal system of coordinates $S_k$ of the source and having a radius $r_k$. It is assumed that the mean magnetic field $B_k (0_k)$ at the center of the turn $SP_k$ is substantially constant in a sphere with a radius $r_k$. The mean field is therefore assumed to be distributed in a substantially constant way in the turn.

This mean field is variable in time and prompts a current $i_k$ in the turn that is proportional to its variation according to the known law of Lentz. This current in its turn prompts a magnetic field according to the known laws of electromagnetism.

The source may also be a magnetization induced by the ambient field in permeable materials (ferromagnetic effects).

Assuming initially that there is a small-sized elementary turn, the expression of the current $i_k$ flowing in the elementary turn plunged into the mean field $B_k (0_k)$ is given by the following relationship:

$$R_k i_k + L_k \frac{d}{dt} i_k = -\frac{d\phi k}{dt} \quad (2)'$$

$R_k$ and $L_k$ being respectively the ohmic resistance and the self-inductance of the turn $SP_k$, $\phi_k$ being the magnetic flux going through the turn.

For a magnetic field $B_k (0_k)$ at the turn varying sinusoidally in time at the pulse $\omega$, we get:

$$i_k[R_k+j L_k \omega] = -j A_k \omega (\vec{B}_k(O_k) \cdot \vec{n}_k) \quad (3)'$$

$A_k$ being the area of the turn $SP_k$;

$\vec{n}_k$ being the normal to the turn;

$\vec{B}_k(0_k) \cdot \vec{n}_k$ representing the scalar product of the ambient magnetic field vector at the center of the turn by the normal $\vec{n}_k$ to this turn.

From the relationship (3), we get:

$$i_k = -j \frac{A_k \omega}{R_k + jL_k \omega} \vec{B}_k(O_k) \cdot \vec{n}_k \quad (4)'$$

By using the reference I to denote the modulus of the alternating current $i_k$, we get:

$$I = |i_k| |\alpha| \vec{B}_k(O_k) \cdot \vec{n}_k = |\alpha| |B_k(O_k)| \cdot \cos(\vec{B}_k(O_k), \vec{n}_k) \quad (5)'$$

$$\alpha = -j \frac{A_k \omega}{R_k + jL_k \omega} \quad (6)'$$

Considering a radial system of coordinates $\vec{u}_\rho$, $\vec{u}_\theta$, $\vec{u}_\phi$, centered at the point $0_c$, the center of the sensor, as shown in FIG. 5, $$\vec{u}_\rho = \frac{\overrightarrow{O_k O_c}}{|\overrightarrow{O_k O_c}|},$$

$\vec{u}_\theta$ and $\vec{u}_\phi$ being two other unit vectors such that $\vec{u}_\rho$, $\vec{u}_\theta$, $\vec{u}_\phi$ form a direct orthonormal system of coordinates $(u_k)$ with $\vec{u}_\theta$ in the plane $(\vec{u}_\rho, \vec{n}_k)$, the field vector $(\vec{B}_{Pk})_{uk}$ created by the turn $SP_k$ is expressed in the radial system of coordinates $\vec{u}_\rho$, $\vec{u}_\theta$, $\vec{u}_\phi$ by three components, a component $B_\rho$ along the axis $\vec{u}_\rho$, a component $B_\theta$ along the axis $\vec{u}_\theta$ and a component $B_\phi$ along the axis $\vec{u}_\phi$. This field $(\vec{B}_{Pk})_{uk}$ models the disturbance of the source k.

The known laws of electromagnetism teach that for $|0_k 0_c| > r_k$, the components $B_\rho$, $B_\theta$ and $B_\phi$ are given by the following relationships:

$$\begin{cases} B_\rho = I \left[ \frac{\mu_o}{4\pi} \frac{2\pi r_k^2}{\rho} \sum_{l=0}^{\infty} (-1)^l \frac{(2l+1)!!}{2^l(l!)} \frac{r_k^{2l}}{\rho^{2l+2}} P_{2l+1}(\cos\theta'_k) \right] & (7)' \\ B_\theta = -I \left[ \frac{\mu_o}{4\pi} \pi r_k^2 \sum_{l=0}^{\infty} (-1)^l \frac{(2l+1)!!}{2^l(l+1)!} \frac{1}{\rho^3} \left(\frac{r_k}{\rho}\right)^{2l} P_{2l+1}^1(\cos\theta'_k) \right] & (8)' \\ B_\phi = o & (9)' \end{cases}$$

with:

$\rho = |\overrightarrow{O_k O_c}|$ $I = |i_k|$ $\theta'_k = (\vec{n}_k, \vec{u}_p)$, $\vec{n}_k = \overrightarrow{O_k Z_k}$ in FIG. 5.

$P_l^m (x) = 1$ order Legendre polynomial $(k)!! = k(k-2)(k-4) \times \ldots 5 \times 3 \times 1$, k being an odd-parity value.

The expressions for $\rho < r_k$ are not given because they do not modify the final model and furthermore in reality $\rho > r_k$.

The expression of the field $(\vec{B}_{Pk})_c$ of the source $S_k$ or of the turn $SP_k$ expressed in the system of coordinates C of the sensor is given by the following relationship:

$$(B_{Pk})_c = (R_{uk/c}) (B_{Pk})_{uk} \quad (10)'$$

where $R_{uk/c}$ is the matrix of passage from the system of coordinates C of the sensor, defined here above, to the system of coordinates $u_k = \vec{u}_\rho$, $\vec{u}_\theta$, $\vec{u}_\phi$ defined here above.

More generally, if we consider a system of three turns having orthonormal axes of symmetry of revolution $\vec{n}_x$, $\vec{n}_y$, $\vec{n}_z$, defining for example the system of coordinates ($S_k$), the resultant field at the sensor $\mathbf{0}_c$ is the sum of the three fields produced by the above turns.

In the radial system of coordinates ($u_k$), the field due to the source k is:

$$(\vec{B}_{Pk}(O_c))_{u_k} = [\vec{B}_{Pk}^1 + \vec{B}_{Pk}^2 + \vec{B}_{Pk}^3]_{u_k} \quad (11)'$$

$\vec{B}_{Pk}^{1,2,3}$ are governed by the equations (7)', (8)', (9)'.

In a first stage, to simplify the explanation, it is assumed that $\rho_k = |\overrightarrow{O_c O_k}| \gg r_x$, $r_y$, $r_z$ radii of the turns. With these assumptions, the formulae (7)', (8)', (9)' giving the $B_{Pk}^{1,2,3}$ above are simplified and written in a way known to those skilled in the art by:

$$(B_{Pk}(O_c))u_k = \frac{1}{\rho_k^3} \begin{bmatrix} 2 & 0 & 0 \\ 0 & -1 & 0 \\ 0 & 0 & -1 \end{bmatrix} P^t [S_x I_x \vec{n}_x + S_y I_y \vec{n}_y + S_z I_z \vec{n}_z] \quad (12)'$$

with $P = [\vec{u}_\rho, \vec{u}_\theta, \vec{u}_\phi]$: matrix of passage from the system of coordinates ($S_k$) to the radial system of coordinates ($u_k$).

$S_x = \pi^2 r_x$, $S_y = \pi r^2_y$, $S_z = r^2_y$, $I_x$, $I_y$, $I_z$ are the currents I of the coils having axes $\vec{n}_x$, $\vec{n}_y$, $\vec{n}_z$.

$S_x I_x$, $S_y I_y$, $S_z I_z$ are respectively the magnetic movements of axes $\vec{n}_x$, $\vec{n}_y$, $\vec{n}_z$.

The matrix P is constant for the source k since it depends only on $\overrightarrow{O_c O_k}$ fixed in the system of coordinates (C) of the sensor or on the system of coordinates ($S_k$) of the source.

In the relationship (12)', the currents $I_x$, $I_y$, $I_z$ are expressed according to the relationships (4), (5), (6), giving:

$$\begin{cases} I_x = |\alpha_x||\vec{B}_k(O_k)|\cos(\theta_x)_{Sk} \\ I_y = |\alpha_y||\vec{B}_k(O_k)|\cos(\theta_y)_{Sk} \\ I_z = |\alpha_z||\vec{B}_k(O_k)|\cos(\theta_z)_{Sk} \end{cases} \quad (13)'$$

As shown in FIG. 6, the vector $\vec{B}_k(\mathbf{0}_k) = \vec{V}_k$ is identified in the system of coordinates ($S_k$) by two angles $\phi_k$ and $\theta_k$, $\phi_k$ identifying the projection of the vector $\vec{V}_k$ representing the magnetic field in the plane $\mathbf{0}_k$, $X_k$, $Y_k$ and $\theta_k$, the angle of the vector $\vec{V}_k$ with $Z_k = \vec{n}_z$.

The following conventions are chosen:

$\cos(\theta_z)_{Sk} = \cos\theta_k$ $\cos(\theta_y)_{Sk} = \sin\theta_k \sin\phi_k$ $\cos(\theta_x)_{Sk} = \sin\theta_k \cos\phi_k \quad (14)'$ By substituting the relationships (13)' and (14)' in the relationship (12)', the expression of the disturbing field ($B_{Pk}(\mathbf{0}_c))_c$ at the point $\mathbf{0}_c$, the point of origin of the system of coordinates C of the sensor, expressed in this system of coordinates C, is obtained by the following relationship using the relationship (10)':

$$\vec{B}_{Pk}(O_C) = \quad (15)'$$

$$|\vec{B}_k(O_k)||R_{uk/C}| \begin{bmatrix} \sin\theta_k(a_x\cos\phi_k + b_x\sin\phi_k) + c_x\cos\theta_k \\ \sin\theta_k(a_y\cos\phi_k + b_y\sin\phi_k) + c_y\cos\theta_k \\ \sin\theta_k(a_z\cos\phi_k + b_z\sin\phi_k) + c_z\cos\theta_k \end{bmatrix}$$

$\|\vec{B}_{PK}(O_k)\|$ being the modulus of the vector $B_{Pk}(\mathbf{0}_k)$.

$\vec{B}_{PK}$ being the ambient field at the point $\mathbf{0}_k$ and $a_x$, $a_y$, $a_z$, $b_x$, $b_z$, $c_x$, $c_y$, $c_z$ represent the coefficients of the matrix:

$$\frac{1}{\rho_k^3}\begin{bmatrix} 2 & 0 & 0 \\ 0 & -1 & 0 \\ 0 & 0 & -1 \end{bmatrix}[P^t]\begin{bmatrix} |\alpha_x|S_x & 0 & 0 \\ 0 & |\alpha_y|S_y & 0 \\ 0 & 0 & |\alpha_z|S_z \end{bmatrix} = \begin{bmatrix} a_x & b_x & c_x \\ a_y & b_y & c_y \\ a_z & b_z & c_z \end{bmatrix}$$

If the hypothesis $\rho k \gg \{Sr_x, r_y, r_z\}$ is not met, the matrix $$\begin{bmatrix} 2 & 0 & 0 \\ 0 & -1 & 0 \\ 0 & 0 & -1 \end{bmatrix}$$

depends on $\rho_k$ and on $\theta'_k$ and on $\phi'_k$ defining the coordinates of $\overrightarrow{O_c O_k}$ according to the formulae (7)', (8)', (9)' that those skilled in the art will be able to apply.

Be that as it may, this matrix remains constant for the source $S_k$. Thus the simplifying assumption changes nothing in the formula (15)' of the disturbing field.

The expression of the field $\vec{B}_{Pk}(\mathbf{0}_c)$ in the sensor system of coordinates is of the same type as that expressed in the system of coordinates ($u_k$), and only the coefficients $a_x$, $a_y$, $a_z$, $b_x$, $b_z$, $c_x$, $c_y$, $c_z$ would be modified in this model.

The coefficients are identified in the sensor system of coordinates (C) for example.

The formula (15)' in fact shows that each component of the model of the disturbance, the vector $B_{Pk}$, is written as the first order borderline development of the real and imaginary parts of the associated Legendre complex function defined by:

$$Z_{l,m}(\theta, \phi) = \sum_{l=1}^{L}\sum_{m=0}^{l}\sqrt{\frac{2l+1}{4\pi}\frac{(l-m)!}{(l+m)!}} P_l^m(\cos\theta)e^{jm\phi} \quad (16)'$$

with $e^{jm\phi} = \cos m\phi + j\sin m\phi$ and with:

$$P_l^m(x) = \frac{(-1)^m(1-x^2)^{m/2}}{2^l l!}\frac{d^{l+m}}{dx^{l+m}}(x^2-1)^l \quad (17)'$$

At the first order, L=1 and m=o and m=1.

More generally, the computations and experiments carried out by the present Applicant have shown that it is possible, for each component of the field vector $B_{Pk}$, the model of the source $S_k$, expressed in the system of coordinates C of the sensor, to have the following definition:

$$(B_{Pk}(O_C))_i = \quad (18)'$$

$$|\vec{V}_k|\sum_{l=1}^{L_k}\sum_{m=0}^{l} P_l^m(\cos\theta_k)[A_{l,m,i}^k\cos(m\phi_k) + C_{l,m,i}^k\sin(m\phi_k)]$$

In this formula $\theta_k$ is the angle of $\vec{V}_k$ with the axis $\vec{O}_z$ of the sensor and $\phi_k$ referenced in the plane $O_c$ $X_c$ $Z_c$ of this same sensor is the projection of $\vec{V}_k$ with reference to $\overrightarrow{O_c X_c}$ according to FIG. 6.

$L_k$ is the order of the development of the Legendre polynomial pertaining to the source k.

This new definition makes no change whatsoever in the foregoing assumptions because the system of coordinates ($S_k$) has been assumed to be any system of coordinates. In this case, it may be considered to be the same as the sensor system of coordinates (C).

since $(B_{Pk}(\mathbf{0}_c))_i$ is the ith component of the vector $(B_{Pk}(\mathbf{0}_c))$, i=1, 2, 3, this component is produced by three turns of modelling of the source $S_k$;

$A_{l,m,i}{}^k$ and $C_{l,m,i}{}^k$ being constants to be identified for the source k.

This model (18)' takes account of the fact that the model using three wire-shaped turns (15)' is a simplified view of the real physical phenomena. In fact, it is necessary to speak rather of pseudo-turns corresponding to the lines of current flowing in the conductive elements.

The model (18)' the disturbance has been prepared and it can be seen that it depends especially, and explicitly, on $\vec{B}_{Pk}(\mathbf{0}_k)$, namely on the external field at the point $\mathbf{0}_k$, the center of the source k.

It is assumed that this field is known:
during the identification of the model, this field is the field $B_E$ transmitted in free space by the transmitter;
in use, in any ambient field, for example in an aircraft cockpit, it is the field put out by the transmitter $B_E$ to which the disturbance field of the cockpit may be added as the case may be.

In the first step of the invention, which consists in determining the unknown coefficients of the model (18), the ambient field $B_E$ put out by the transmitter is known according to a method taught in the French patent No. 90.08230: the measurement of the field $\vec{B}_c(\mathbf{0}_c)$ resulting from the transmission of each of the three transmission coils makes it possible, according to this method, to give a value very close to the position of the center of the sensor $(X_c, Y_c, Z_c)$ in the system of coordinates (E) of the transmitter or the reference system of coordinates Ref when it is sought to make the helmet undergo rotations and translational movements.

With an estimation of $X_c$, $Y_c$, $Z_c$ being known, the value of the ambient field $\vec{B}_E$ at the center of the sensor is deduced therefrom.

Then, the field $\vec{V}_k = \vec{B}_k(\vec{0}_k)$ is expressed as a function of the coordinates of $\mathbf{0}_k$ in the reference system of coordinates:

$$\overrightarrow{O_R O_k} = \overrightarrow{O_R O_c} + \overrightarrow{O_c O_k}$$

where $(\overrightarrow{O_c O_k}) = R_{c/Ref} \cdot (\overrightarrow{O_c O_k})_c$ $= \text{ROT} \cdot (\vec{\rho})_c$ $(\vec{\rho})_c = (\overrightarrow{O_c O_k})_c$ is constant in the sensor system of coordinates or in the system of coordinates $(S_k)$.

ROT is the rotation of the helmet equal to $R_{c/Ref}$ the matrix of passage from the reference system of coordinates Ref to the sensor system of coordinates (C).

In the stage of identification of the model, ROT is known and the coordinates of the source k in the system of coordinates (Ref) are deduced therefrom as a function of the coordinates $\vec{X}'_k$ of the source in the sensor system of coordinates, these being unknown quantities that have to be identified during this first step of the invention.

The coordinates of the source k in the reference system of coordinates are expressed by:

$$\vec{X}_k = \vec{X}_c + \text{ROT} \cdot (\vec{\rho})_c$$

or again $\vec{X}_k = \vec{X}c + \text{ROT} \cdot (\vec{X}'_k)$

In the identification stage, ROT is the known rotation of the helmet. The values of $(\vec{X}_c)$, representing the coordinates of the center of the sensor in the reference system of coordinates, are known for example in approximately by the method of the French patent 90.08230. It is sought to identify three components of $\vec{X}'_k = (\vec{\rho})_c$. $(\vec{B}_k(\mathbf{0}_k))_c = \text{ROT}^{-1} \cdot [BE(\vec{X}_k)]_{Ref}$ is deduced therefrom and is substituted in the formula (18)'.

After several iterations on $\vec{X}'_k$ and on $A_{l,m,i}{}^k$ and $C_{l,m,i}{}^k$, the estimation $\vec{X}_k$ of improved and the values of the parameters of the model, namely the components $(X_c)_{1,2,3}$ of the vector $\vec{X}_c$ and the $(A_{l,m,i}{}^k$ and $C_{l,m,i}{}^k)$ converge towards their true value.

The convergence is acquired when the total field measured by the sensor and its model (1)' are substantially equal at every point in space, namely when $(\vec{X}'_k)$, $A_{l,m,i}{}^k$ and $C_{l,m,i}{}^k$ minimize the mean square deviation between a measurement field modelled according to the relationships (1)' and (18)'.

The model has to be reidentified for each field BE sent out by each coil of the transmitter, the transmission coils being three in number for example. These fields are sent out sequentially or nonsequentially. They are, for example, linearly independent. This is the case especially if the transmission coils are quasi-orthogonal.

In the case of a transmitter with three coils, there are therefore 9 terms of the type of the relationship (18)' to be defined, three components of space of the vector $B_k$ being defined for the three transmission coils. This has to be done for all the sources of disturbance, with k varying from 1 to NS, NS being the total number of these sources.

Thus, for the identification of the model of each source, what has to be done actually is to identify the coefficients $A_{l,m,i}{}^k$ and $C_{l,m,i}{}^k$ of the relationship (18') for the three transmission coils as well as the coordinates $(X'_k)$ of the center $O_k$ of the source $S_k$. The coefficients $A_{l,m,i}{}^k$ and $C_{l,m,i}{}^k$ and $(X'_k)$ are, for example, parameters representing the helmet and the source $S_k$ for a given helmet. It is possible to place the support rigidly binding the sensor C and the source of disturbance $S_k$, namely the helmet, in the field of the transmission coils and carry out the operations of translation and rotation of the helmet. With this field or its model put out by the coils being known beforehand, it is possible to measure the disturbance by difference and obtain an identification, by a standard iterative method, of the parameters $(X'_k)$, $A_{l,m,i}{}^k$ and $C_{l,m,i}{}^k$ that minimize the mean quadratic deviation between the measurement and the previously known field or its model. This operation may be done, for example, definitively in the factory. The parameters $(X'_k)$, $A_{l,m,i}{}^k$ and $C_{l,m,i}{}^k$ are, for example, memorized in a circuit 8 resident in the helmet, this circuit possibly being a PROM, EPROM, or EEPROM type memory in particular. The identification of these parameters $A_{l,m,i}{}^k$ and $C_{l,m,i}{}^k$ and $(X'_k)$ and their storage in the helmets enables these helmets to be made easily interchangeable.

Another following sub-step 33 consists of the modelling of a cockpit No. l, with measurements in this cockpit fitted out with a cartographic tool, a sensor No. i", and a transmitter No. j".

Before providing a description, by an exemplary embodiment, of this sub-step 33, it may be recalled that it is sought to have precise knowledge of the disturbing field induced by the set of conductors of the cockpit under the effect of an inductive field called $B_0$ (x y z) known in the reference system of coordinates of the transmitter.

The volume scanned by the sensor is within the cockpit and does not contain any current sources.

To identify the model of the disturbing field induced here above, called $B_1$ (x, y, z), there are a certain number of known measurements of the total field $[B_0(x\ y\ z) + B_1(x\ y\ z)]$ measured at points $(x_m, y_m, z_m)$ of the volume, m=1, M, corresponding to the center of the orientation sensor denoted by its rotation matrix $R_{C/M}$ with respect to a mechanical system of coordinates.

These points of measurement are obtained by known translational motions in a mechanical system of coordinates of the tool bearing the sensor and by rotations of the same tool known in the reference system of coordinates:

$$(R_{C/C0})_M \ (R_{C/M})_n = (R_{C/C0})_M \ (R_{C0/M})_{M'} \quad (C1)$$

The notation C0 correspond to the orientation of the sensor when the rotation of the tool is zero (namely $R_{C0/C0} \triangleq I$) (I being the identity matrix).

On the basis of these measurements, the unknown parameters of the model are identified, the coordinates and orientations of the sensor at each measurement point being known to the closest value of one translation and one rotation.

Since the problem is of the magnetostatic type, the two basic equations are the following:

$$\nabla \cdot B = 0 \quad \nabla \times H = J$$

or again div B=0 rot H=J

Since in the volume of interest, namely the volume in which the sensor freely moves, the current density $J_{(x\ y\ z)}$ is zero, the equations are reduced to $\nabla \times H = 0$ with the condition $\nabla \cdot B = 0$.

Since $\nabla \times H = 0$, H is derived from a scalar potential $\phi_1(x\ y\ z)$: $H = -\nabla \phi_1$.

We also obtain the relationship $B = \mu_o H$.

The relationship on the potential is written as follows:

$$\nabla \mu_o \nabla \phi_1 = 0 \rightarrow \nabla^2 \phi_1 = 0 \quad (C3)$$

This is the well-known Laplace equation.

Now, the solutions to the Laplace equation are well known: they are harmonic functions:

for a parallelepiped volume whose sides have lengths a, b, c, rectangular coordinates are chosen and the functions are of the following type:

$$\phi_{(xyz)} = \sum_{n,m=1}^{\infty} A_{nm} Sin(\alpha_n x + \theta_{xn}) Sine(\beta_m y + \theta_{yn}) Sineh(\gamma_{nm} z + \theta_{znm})$$

The parameters $A_{nm}$, $\theta_{xn}$, $\theta_{yn}$, $\theta_{xnm}$, $\alpha_n$, $\beta_m$, $\gamma_{nm}$, are identified through knowledge of the field measured at points (x y z)sensor for which we have:

$$[B_{(x\ y\ z)sensor}]_{measure} = -\mu \nabla \phi_{(xyz)}. \quad (C5)$$

and it being known that:

$$\alpha_n = \frac{n\pi}{a}, \ \beta_m = \frac{m\pi}{b} \ \gamma_{nm} = \pi \sqrt{\frac{n^2}{a^2} + \frac{m^2}{b^2}} \quad (C6)$$

for a spherical volume for which a system of spherical coordinates ($\rho$, $\theta$, $\phi$), the general solution is based on the series of associated Legendre functions:

$$\phi_{(\rho,\theta,\phi)} = \sum_{l=0}^{\infty} \sum_{m=-l}^{l} [A_{l,m}\rho^l + B_{l,m}\rho^{-(l+1)}] Y_{l,m}(\theta, \phi)$$

where the spherical harmonic functions $Y_{l,m}$ are defined by:

$$x = \rho \cos_\theta \cos \phi; \ y = \rho \cos_\theta \sin e \phi; \ z = +\rho \sin e_\theta \quad (C7)$$

$$Y_{l,m}(\theta, \phi) = \sqrt{\frac{2l+1}{4\pi} \ \frac{(l-m)!}{(l+m)!}} \ P_l^m(\cos\theta) e^{im\phi} \quad (C8)$$

and where $$P_l^m(x) = (-1)^m (1-x^2)^{m/2} \frac{d^m}{dn^m} P_l(x)$$

(9) with $P_l(x)$: l order Legendre polynomial.

Often l, m are positive integers. However, it is quite possible, without changing the method, to use more general approaches: the first species and non-integer $\gamma$ order Legendre function determined by the borderline conditions. The function $Y_{l,m}$ becomes $Y_{\gamma,\nu}$ where $\gamma$ and $\nu$ are fractional.

The identification of the coefficients is done as described hereinafter.

In the same way as here above, the coefficients $A_{l,m}, B_{l,m}$ which are complex numbers are determined by the minimizing of a criterion of distance (least error squares) of the following type:

$$\epsilon^2 = \quad (C10)$$

$$\text{MIN OF } \sum_{i=1}^{M} \left[ \nabla \cdot \left[ \sum_{l=0}^{L} \sum_{m=-l}^{l} [A_{l,m}\rho_i^l + B_{l,m}\rho_i^{-(l+1)}] \right] Y_{l,m}(\theta\phi)_i \right] - [B_{(\rho,\theta,\phi)isensor}]_{measured}]^2$$

with $$[B_{(\rho,\theta,\phi)isensor}]_{measured} = \frac{1}{k_{CR}} [K_C H_C]^{-1} [M]_i [H_R K_R]^{-1} = [B_C]_i$$

M: number of measurements
$[M]_i$: matrix of measurement at the instant i.
L: order of the Legendre polynomial.

and $$\vec{\nabla}\phi = \vec{e}_1 \frac{\partial \phi}{\partial \rho} + \vec{e}_2 \frac{1}{\rho} \frac{\partial \phi}{\partial \theta} + \vec{e}_3 \frac{1}{\rho \sin\theta} \frac{\partial \phi}{\partial \phi} \quad (C11)$$

$\vec{e}_1$, $\vec{e}_2$, $\vec{e}_3$ are the unit vectors of $\vec{O_R O_c}$ and of the two vectors forming a direct trihedron.

The order of the model is determined by trial and error until the error $\epsilon^2$ is sufficiently low. In fact, the order depends on the error of the line of sight $\delta T$ which must be smaller than a certain value in 95% of cases.

The error of the line of sight is likened to the error of rotation of the sensor as shall be seen hereinafter.

There are two possibilities for identifying the coefficients of the model in the cockpit:

the first possibility consists of the identification, by the model (C7), of all the fields $$B(x\ y\ z) = B_o(x\ y\ z) + B_1(x\ y\ z).$$

This method gives appropriate results:

the second method which shall be specified hereinafter consists in identifying the field $B_1(x\ y\ z)$ alone.

The operation is done in two stages:

The field $B_0(x\ y\ z)$ is identified as a free space by using the measurement of the sensor containing $B_0 + B_1$. In fact, the parameters of $B_0$ are identified. This solution works in zones that are rather close to the transmitter, $B_1 \ll B_0$.

The parameters $R_{CO/M}$, $\vec{X}_{OE/M}$, $R_{E/M}$ respectively giving the orientation of the sensor in the mechanical system of coordinates and the position and orientation of the transmitter in the same system of coordinates system are accurately identified in the cockpits of aircraft or helicopters. Although this is not obvious, it has been verified by the results obtained by the Applicant.

Similarly with the corrected measurement $[B_c]$, the previously identified model $B_0$ is withdrawn to obtain the estimated value of $B_1$:

$$[\hat{B}_1 \ x \ y \ z]_{measured} = [B_C] - [\hat{B}_0 \ (x \ y \ z)] \tag{C12}$$

The coefficients $A_{l,m}, B_{l,m}$ of the model are estimated by replacing $[B_{(\rho, \theta, \phi)_{sensor}}]_{measured}$ of of (C10) by $(\hat{B}_1(x, y, z))$ estimated from (C12).

This approach is preferred to the former one because the positions and reorientation of the transmitter are known in the reference system of coordinates of the carrier. It is thus possible to take account thereof during the changing of transmitters since these parameters are memorized in the memories 9 linked to the transmitter.

The first step of the method according to the invention comprises a last sub-step 34 for the generation of a comprehensive model B, the sum of the two models $B_0$, $B_1$, identified independently and on the basis of which overall coefficients of the type identified according to the method of the French patent 90.08230 are obtained, namely a polynomial model that is linear with respect to the input variables representing coefficients of the total field B obtained by a stage of identification 341 according, for example, to the method of the French patent 90.08230.

The coefficients are placed in a memory 35 called an equipment memory.

Figure 7:
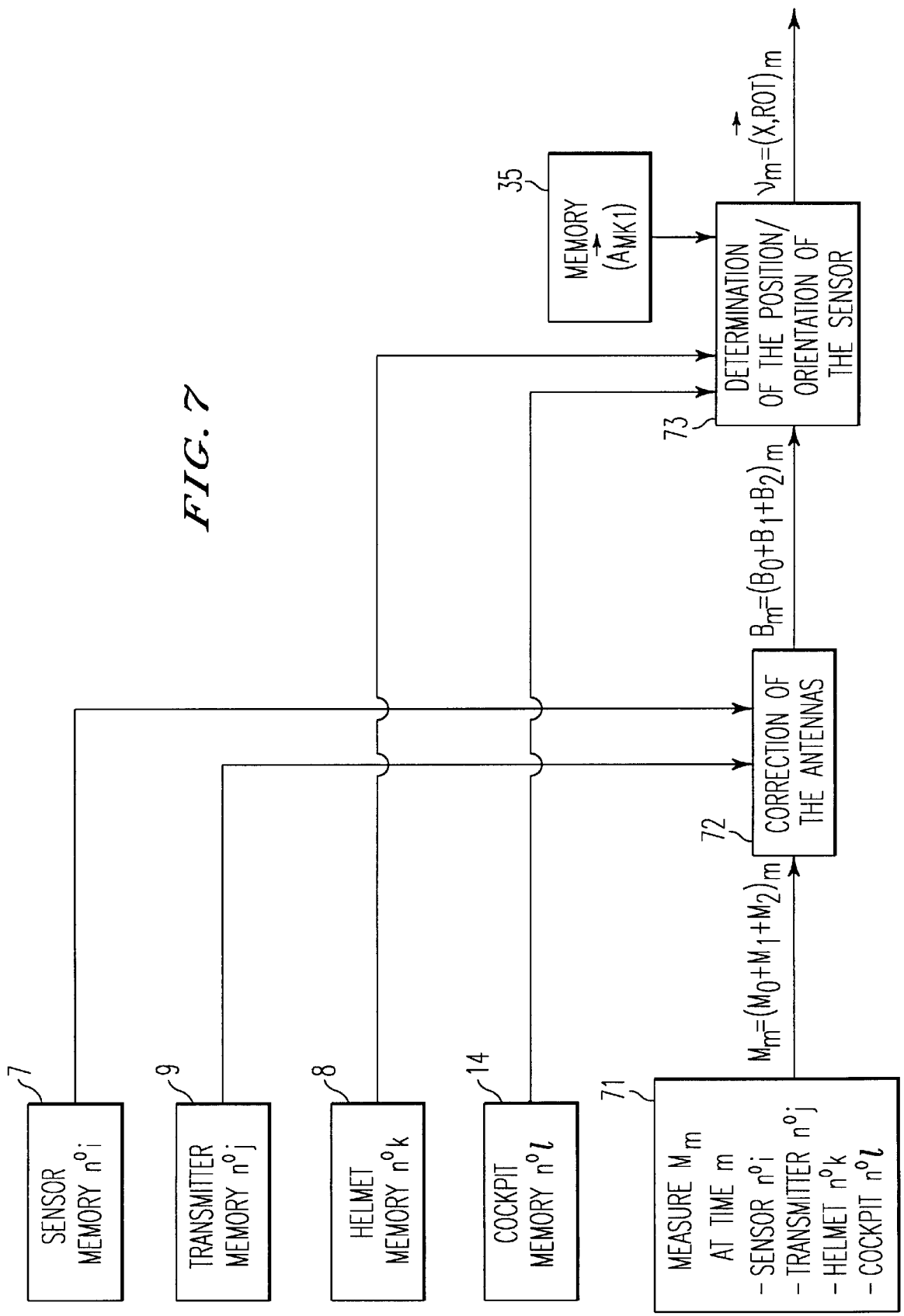
FIG. 7 illustrates a possible implementation of the second step of the method according to the invention.

FIG. 7 illustrates the second step of the method according to the invention, which is the step of the position and orientation of the sensor in operational functioning performed in a first stage 71.

On the basis of the measurement of the three fields transmitted by the three axes of the sensor, namely nine measurements made in a first sub-step 71, at the current instant m, it is necessary to determine the position and orientation of the sensor and make a deduction therefrom of the orientation of the line of sight in the reference system of coordinates of the aircraft.

For this purpose, as can be seen in FIG. 7, in addition to the nine measurements of $[M]_c$, the parameters of the following models are available:

free space $(A_0)_{i,n}$ pertaining to the sensor i and the transmitter j memorized in the sensor memory 7 No. i and in the transmitter memory 9 No. j;

cockpit: $(\vec{A}_1)_l$ pertaining to the cockpit I memorized in the cockpit memory 14 No. l;

helmet: $(\vec{A}_2)_k$ pertaining to the helmet k, memorized in the helmet memory No. k.

These parameters have been obtained in the first step illustrated in FIG. 3. In addition, through the equipment memory 35, there is available the model of the approximate total field of $(B_0+B_1)$ through $(\vec{A}_{MK1})$.

The problem amounts to finding the vector v defined here above, the components of which are the position and orientation of the sensor, making it possible to find a minimum Euclidean distance between the function model of v and the corrected current measurement $[B_C]$.

The corrected current measurement $[B_C]$ is obtained in a second sub-step 72 for the correction of the antennas of the sensor and of the transmitter on the basis of the coefficients stored in their associated memories 7, 9 and the measurements of the first sub-step 71.

Then, in a third sub-step 73, the principle consists in determining the optimum vector $\vec{v}$ by a method of non-linear optimization.

What is to be done is to determine the components of v that minimize a criterion C of euclidean distance between the corrected measurement $[B_C]$ and the model of this measurement.

$$C = \sum_{j=1}^{9} \{[B_C] - [ROT]'[B_o(\vec{X}_c)] - [B_2(Rot, X_x)]\}_j^2$$

for the helmet in free space $$C = \sum_{j=1}^{9} \{[B_C] - [ROT]'[[B_o(\vec{X}_c)] - [B_1(\vec{X}_c)]] + [B_2(\vec{X}_c)]\}_j^2$$

for the helmet in disturbed space j is the index of the components of the matrices $[B_C], [B_0]$ and $[B_2]$.

$[B_2]$ expressed in (C) as $[B_C]$.

9 being the number of components of these matrices.

The main constraint of this iterative method is the convergence time. The optimum has to be found in a period of time fixed in advance guaranteeing the real time, for example (at 100 Hz it is necessary to furnish the information $\vec{v}$ on position/orientation).

To guarantee a small time of convergence, it is also necessary to ensure that, at each new computation cycle, every 10 ms for example, the initial value of $\vec{v}$ must be very close to the optimum. This entails the assumption that no loss of position/orientation can occur following breaks in the measurements.

To ensure that, at each cycle, there is the right initial position/orientation, the operation uses, for example, the so-called MK1 method from the patent 90.08230 to initialize $\vec{v}$ (position/orientation) and any other polynomial model giving the position and orientation of the sensor by a linear combination of the values defined by the sensed position.

In a first step, we have shown how the coefficients $\vec{A}_{MK1}$ of the model MK1 have been identified. These coefficients are, for example, stored in the equipment memory 35.

Figure 8:
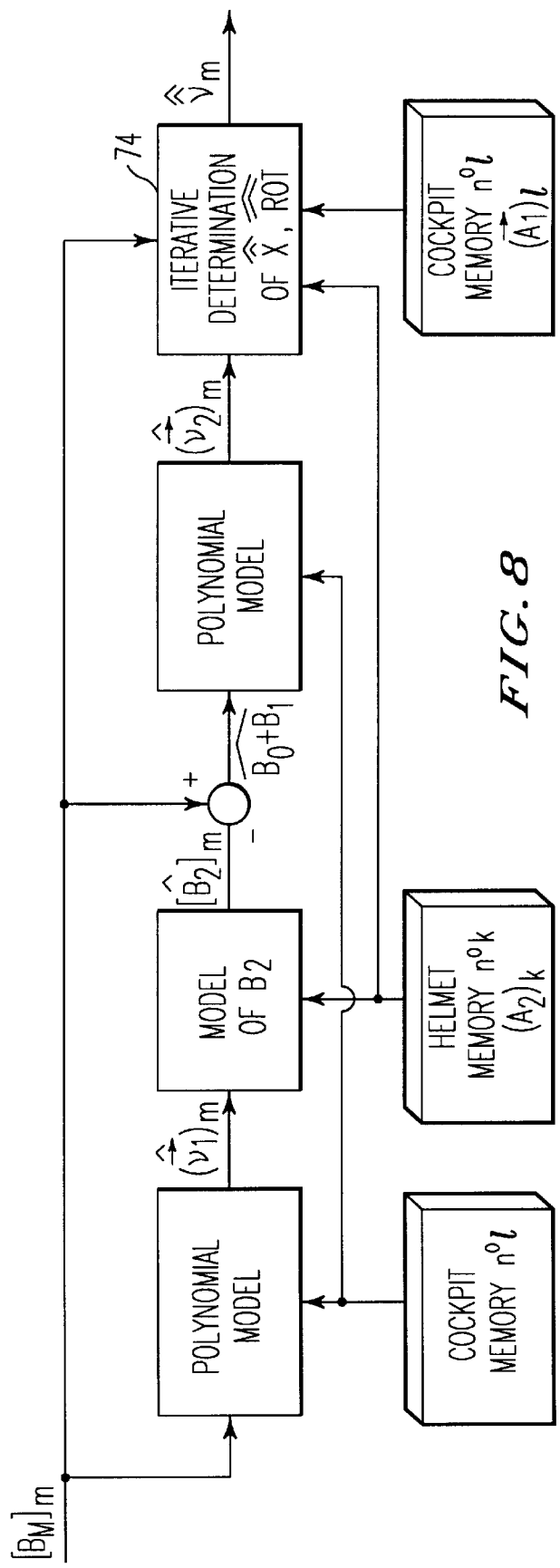
FIG. 8 illustrates a possible sub-unit of the method according to the invention.

FIG. 8 illustrates the third sub-step 73 showing the different stages of the determining of $v_m$ on the basis of $[B_C]_m$ at the instant m.

The sub-step 73 can be broken down into an initialization stage and a stage of non-linear optimization 74 making it possible, in a minimum amount of time, to determine the position and orientation of the sensor.

An initial approximation $\vec{v}_1$ is, for example, given on the basis of a model MK1 representing a mean or standard unit (antennas and cockpits), it being known that this method of determination of $\vec{v}$ is not iterative owing to the linearity of the model.

Another polynomial type of model could be used, based on finite elements for example.

This first identification enables the computation of an approximate model of the field $B_2$: $[\vec{B}_2]_m$ that is deducted from the corrected measured field $[B_C]_m$.

The model of the field $B_2$ computed is, for example, the one defined by the coefficients obtained in the sub-step 32 of the first step of modelling pertaining to the model of the helmet.

The iterative method that enables the determining of $\hat{\vec{\hat{v}}}_m$ on the basis of $(\vec{v}_2)_m$ based on the minimizing of a criterion C may meet, for example, the following equation:

$$v^{Min}C = v^{Min} \sum_{j=1}^{9} \{[B_C]_m^{(j)} - R\hat{O}T^{-1}[B_0^j(\hat{\vec{X}}_C) + B_1^j(\hat{\vec{X}}_C) + B_2^j(R\hat{O}T,\hat{\vec{X}}_C)]\}$$

$R\hat{O}T^{-1} \neq R\hat{O}T^t$, 9 being the number of components measured at each instant m, j is the index of each term of the matrices $B_C$, $B_0$, $B_1$, $B_2$ (j=1 to 9) estimated by their model.

On the basis of the orientation of the sensor ROT, the orientation of the line of sight LV is determined. This is a fixed vector linked to the sensor.

The model $B_2$ may also, in addition to the effects due to eddy currents, cover purely magnetic effects of the soft iron type pertaining, for example, to ferromagnetic magnetization.

The invention has been described for an application to the determining of the position and orientation of the line of sight of a helmet in an aircraft cockpit. However, it can be applied to any mobile system in an electromagnetic environment.

In a case of application to a helmet sensor, the antennas and helmet are modelled independently of one another and of the pilot's cockpit. This modelling is done for example in the factory. All the sub-units of the equipment are interchangeable, as are the cockpits, with all these elements having their own model.

What is claimed is:

1. A method for determining a position and an orientation of a mobile system with respect to a transmitter of an electromagnetic field, the mobile system being placed in a carrier and being linked to a magnetic field sensor, wherein said method comprises the steps of:

analytic modeling of electromagnetic fields as a function of coordinates of the sensor, a first field ($B_0$) being created by the transmitter, a second field ($B_1$) being created by electrical currents induced in the carrier by the first field ($B_0$), and a third field ($B_2$) being created by electrical currents induced in the mobile system by the first two fields ($B_0+B_1$), a magnetic effect of each field ($B_0$, $B_1$, $B_2$) being characterized, independently of effects of the other fields, by coefficients of a model thereof;

computing, in real-time, the position and the orientation of the sensor based on a current measurement of an electromagnetic field at the sensor and the models of the fields ($B_0$, $B_1$, $B_2$) obtained in the modeling step, the position and orientation of the sensor being defined from a corrected measured field ($B_c$).

2. The method according to claim 1, further comprising the step of:

characterizing each of the electromagnetic fields ($B_0$, $B_1$, $B_2$) separately from effects of the other fields by identification of respective parameters ($\vec{A}_0$, $\vec{A}_1$, $\vec{A}_2$) thereof.

3. The method according to claim 1, further comprising the step of:

associating first and second polynomial models, that provide a comprehensive and approximate expression of the position and the orientation of the sensor, with the models of the fields ($B_0$, $B_1$, $B_2$) obtained in the modeling step, the first and second polynomial models being non-linear with respect to the position of the sensor, the first model enabling a non-iterative approximate resolution and the second model using approximate values of the non-iterative approximate resolution to make a corrected identification of the position and the orientation of the sensor by an iterative method of resolution of a non-linear criterion.

4. The method according to claim 1, wherein parameters ($\vec{A}_0$) of the model of the effects of the first field ($B_0$) are stored in a memory associated with the transmitter and the sensor, parameters ($\vec{A}_1$) of the model of the effects of the second field ($B_1$) are stored in a memory related to the carrier, and parameters ($\vec{A}_2$) of the model of the effects of the third field ($B_2$) are stored in a memory associated with the mobile system.

5. The method according to claim 1, wherein parameters ($\vec{A}_{MK1}$), of a generic comprehensive model of a sum of the first and second fields ($B_0+B_1$), are stored in a memory.

6. The method according to claim 1, wherein the analytic modeling step comprises a sub-step of determining coefficients of a model of effects of the sensor in free space, without disturbance.

7. The method according to claim 6, wherein the sub-step of determining the coefficients of the model in free space comprises the steps of:

combining, at each transmission, three component vectors of the transmitter field $\vec{M}_1$, $\vec{M}_2$, $\vec{M}_3$ in a measurement matrix $\{M\}=\{\vec{M}_1, \vec{M}_2, \vec{M}_3\}$; and identifying parameters on which the model in free space depends, including:

angular coordinates $R_{E/Ref}$ and coordinates of a position $\vec{X}_E$ of the transmitter in a reference system of coordinates (Ref) defined by a translation matrix from the reference system of coordinates to the system of coordinates of the transmitter (E), angular coordinates of the sensor in a reference system of coordinates defined by a matrix $R_{CO/R}$ when a support of the sensor is in an angular reference position, and matrices corresponding to a correction of a scale factor of the transmitter and of a coupling of the transmitter $\{H_R K_R\}$, and a correction of a scale factor of the sensor and of a coupling of the sensor $\{H_C K_C\}$.

8. The method according to claim 1, wherein the analytic modeling step comprises a sub-step of modeling, in free space, of the mobile system equipped with a sensor and comprising field-disturbing materials.

9. The method according to claim 8, wherein with sources of disturbance ($S_1, S_2, S_3, \ldots, S_k$) being linked to the sensor, the sub-step of modeling in free space of the mobile system comprises the steps of:

expressing, with the sources of disturbance being inserted into any given ambient magnetic field, a disturbance caused by each disturbance source as an explicit function of a mean magnetic field existing at the disturbance source to create a model representing a disturbance thereof at the center of the sensor;

determining, with the sensor being inserted into a magnetic field to be measured, a disturbance caused by each disturbance source based on the disturbance model thereof, and determining a mean magnetic field existing at a level thereof;

summing the disturbances due to the sources of disturbance; and deducting the sum of the disturbances from the measurement made by the sensor, each disturbance source being modeled by at least one equivalent turn $S_{Pk}$, variations of an ambient field $B_k$ at the equivalent turn creating a current $i_k$ in the equivalent turn, which produces a disturbance field.

10. The method according to claim 9, wherein the disturbance caused by a source of disturbance of the sources of disturbance $(S_1, S_2, S_3, \ldots, S_k)$ is modeled by a magnetic field vector ($\vec{B}_{Pk}(O_c)$) at the sensor, the magnetic field vector being expressed as follows for each component:

$$B_{Pk}(O_C)_i = |\vec{B}_k(O_k)| \sum_{l=1}^{L_k} \sum_{m=0}^{l} P_l^m(\cos\theta_k)[A_{l,m,i}^k \cos(m\phi_k) + C_{l,m,i}^k \sin(m\phi_k)];$$

$(B_{pk}(O_c))_i$ being an ith component of the vector ($\vec{B}_{Pk}(O_c)$) at a center (C) of the sensor and being produced by at least one modeling turn of the source of disturbance $(S_k)$, k=1, 2, 3;

$\vec{B}_k(O_k)$ being an ambient field vector at a point $O_k$ which is a center of the source of disturbance k and $|\vec{B}_k(O_k)|$ being a modulus thereof;

$\theta_k$ being an angle between an axis $\vec{O_cZ_c}$ of the sensor system of coordinates and the magnetic field vector $B_k(O_k)$ at the center $O_k$ of the turn;

$\phi_k$ being an angle between an axis $\vec{O_cX_c}$ of the sensor system of coordinates and a projection of the magnetic field vector $B_k(O_k)$ on a plane defined by the axes $\vec{O_cX_c}$ and $\vec{O_cY_c}$;

$(O_c, X_c, Y_c, Z_c)$ being the system of coordinates of the sensor;

$P_l^m(x)$ being an l, m order Legendre polynomial defined by:

$$P_l^m(x) = \frac{(-1)^m(1-x^2)^{m/2}}{2^l l!} \frac{d^{l+m}}{dx^{l+m}} (x^2-1)^l; \text{ and}$$

$A_{l,m,i}^k$ and $C_{l,m,i}^k$ being constants.

11. The method according to claim 1, wherein the analytic modeling step comprises a sub-step of modeling of the carrier by measurements therein, the carrier being provided with a set of cartographic tools, the sensor and the transmitter.

12. The method according to claim 11 wherein, on the basis of the measurements in the carrier, unknown coefficients of the model of the effects of the second field ($B_1$) are identified, coordinates and orientation of the sensor, at each measurement point, being known to a nearest translation and to a nearest rotation.

13. The method according to claim 8, further comprising the step of:

identifying coefficients $(A_{l,m}, B_{l,m})$ of the model of the effects of the second field ($B_1$) by least-squares error minimization of a distance criterion based on the following equation:

$$\epsilon^2 = \text{MIN OF} \sum_{i=1}^{M} \left[\left[\nabla \cdot \left[\sum_{l=0}^{L} \sum_{m=-l}^{l} [A_{l,m}P_l^l + B_{l,m}P_l^{-(l+1)}]\right] Y_{l,m}(\theta\phi)_i\right] - [B_{(C,\theta,\phi)_i}]\right]^2;$$

M being a number of measurements;

L being an order of the Legendre polynomial;

a gradient of a scalar $\phi(\rho, \theta, \phi)$ being expressed as:

$$\vec{\nabla}\phi = \vec{e_1}\frac{\partial\phi}{\partial\rho} + \vec{e_2}\frac{1}{\rho}\frac{\partial\phi}{\partial\theta} + \vec{e_3}\frac{1}{\rho\sin\theta}\frac{\partial\phi}{\partial\phi}; \text{ and}$$

an order of the model being determined by trial and error until the error $\epsilon^2$ is minimized to a predetermined amount.

14. The method according to claim 1, wherein the analytic modeling step comprises a last sub-step of generating a comprehensive model, which is a sum of the two models of the effects of the first and second fields ($B_0$, $B_1$) identified independently.

15. The method according to claim 14, wherein the comprehensive model is a polynomial model.

16. The method according to claim 1, wherein the computing step further comprises the sub-steps of:

measuring the transmitted electromagnetic fields;

correcting antennas of the sensor and of the transmitter on a basis of coefficients stored in memories associated with the sensor and transmitter, and correcting measurements carried out in the measuring step; and determining the position and the orientation of the sensor.

17. The method according to claim 16, wherein the determining step comprises an initializing step and a non-linear optimizing step, for determining the position and the orientation of the sensor.

18. The method according to claim 17, wherein the non-linear optimizing step is iterative, a position $\vec{v}$ m of the position and the orientation being defined on a basis of a determination $\vec{v}2$ m by minimizing of a criterion C as follows:

$$\text{Min}_{\vec{v}} C = \text{Min}_{\vec{v}} \sum_{j=1}^{9} \{[B]_m^j - ROT[B_0^j(\vec{X_c}) + B_1^j(\vec{X_c})] + B_2^j(ROT, \vec{X_c})\}$$

$$\vec{v} = \begin{vmatrix} \vec{X_c} \\ \overrightarrow{ROT} \end{vmatrix};$$

$B_0$, $B_1$, $B_2$ being the transmitted electromagnetic fields;

B being a total transmitted electromagnetic field; and 9 being a number of components measured at each instant M.

19. The method according claim 1, wherein the mobile system comprises a helmet visor having a line of sight associate therewith and the carrier comprises a cockpit.

20. The method according to claim 19, wherein antennas of the sensor, antennas of the transmitter, and the helmet visor are modeled in a factory independently of one another and of the cockpit.

* * * * *